United States Patent
La Point

[15] 3,638,200
[45] Jan. 25, 1972

[54] ELECTROSTATIC RECORDING SYSTEM

[72] Inventor: James P. La Point, Albuquerque, N. Mex.

[73] Assignee: The United States of America as represented by the United States Atomic Energy Commission

[22] Filed: Mar. 4, 1970

[21] Appl. No.: 16,508

[52] U.S. Cl. .................................340/173 CA, 346/74 ES
[51] Int. Cl. ...............G11c 11/24, G11b 25/04, G01d 15/06
[58] Field of Search ..............340/173 R, 173 CA; 346/74 ES

[56] References Cited

UNITED STATES PATENTS 3,185,968  5/1965  Hammond ............................340/173

Primary Examiner—Terrell W. Fears
Attorney—Roland A. Anderson

[57] ABSTRACT

Electrostatic recording wherein a plurality of segments on an insulative member are capacitively coupled to a conductive element coextensive with the segments, with coupling of electrical signals to segments to charge the segments and sensing of charges on these segments, together with relative movement of the segments and the coupling and sensing means.

5 Claims, 7 Drawing Figures

PATENTED JAN 25 1972
3,638,200
SHEET 1 OF 2
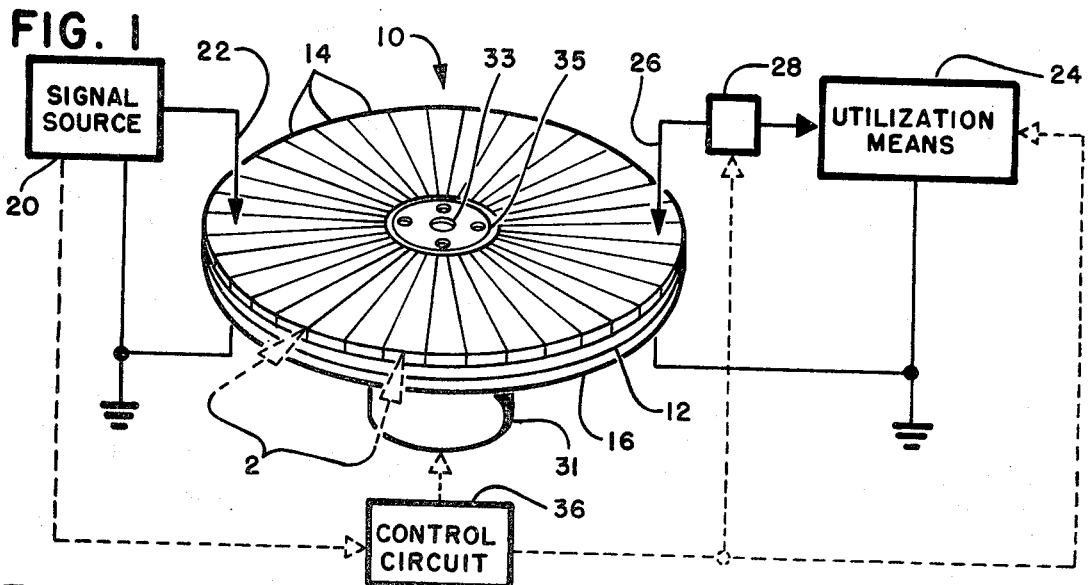
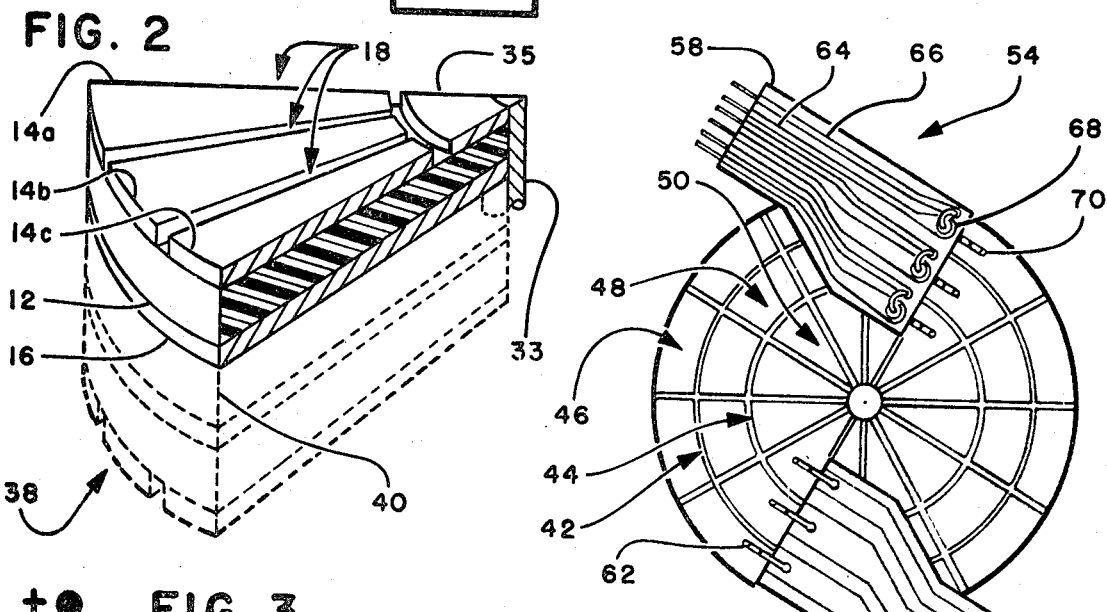
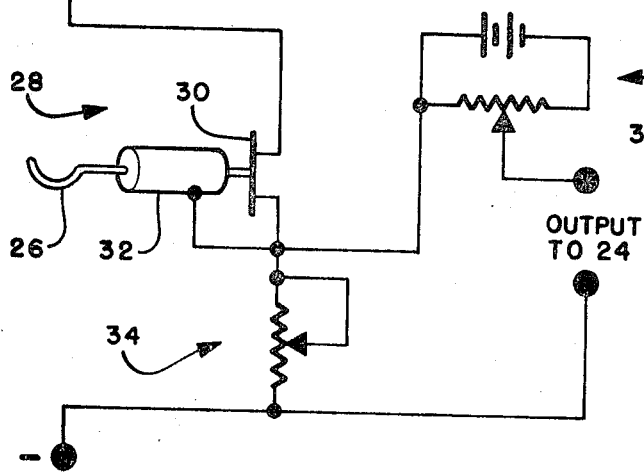
INVENTOR.
JAMES P. LA POINT
BY

INVENTOR.
JAMES P. LA POINT ic RECORDING SYSTEM

BACKGROUND OF INVENTION

Electrical signals or information are conventionally recorded or stored in a wide range of apparatus utilizing magnetics, capacitance, electronics and the like. Often, it is desirable to provide a record of an electrical event or signal which is occurring continuously over a relatively long period of time which may at some unpredictable point in time change or vary or indicate some type of function or malfunction. Generally, it is not necessary to maintain permanently a complete record of the electrical signal during its normal operation but only immediately prior to and just after the anomaly occurs. In such situations, it would be desirable to continuously record the signal, and then, when an anomaly occurred, retain a portion of the signal near or at the occurrence of the anomaly and discontinue further recording. The portion could then be played back and analyzed. In many applications, it would be desirable during this playback to change the speed of playback relative to the record speed to extend or expand the time scale of the playback signal relative to the time scale of the original signal.

Such operation may be achieved with a "loop-type" recording system, such as by using a loop of magnetic tape. Since the recording system may have to record for an extended period of time before an anomaly occurs, it is desirable that the loop-type recording system have extended life. However, with magnetic tape systems, the life span of the system is limited by such as the life of the tape itself. Further, the tape may not be played back, in many instances, at a different rate of speed as it is recorded without utilizing compensating electronics in the readout circuits. Such circuits add to the complexity and cost of the system and limit its flexibility for different situations. Further, as the magnetic tape is used, its signal to noise ratio may decrease with use and wear.

A typical operation which may utilize this loop-type recording system is that of life or other long-term testing of equipment, such as the electrical life of solenoids, relays, switches or solid state devices or the mechanical life under stress of materials or structures. Further, in many of these tests, more than one variable or parameter may be monitored at a time which it would be desirable to record simultaneously with all other variables for later playback and analysis upon an anomaly or malfunction. For example, in a relay life or operation test, it may be desirable to record the contact resistance, coil voltage, relay pull-in and dropout times. For a mechanical member under stress, it may be desirable to record the stress level applied to the member while recording the stress, or different types of stress, at different portions along the member to more readily discern the type of failure. Such tests, may continue for many thousands of hours of operation in which only a few seconds of operation is needed on the recorder.

In most of these operations, the type of signal being recorded is of an analog rather than digital nature. Additionally, it may be desirable to mix two or more signals in a single channel of a recorder to achieve a composite signal for later playback and analysis or to record simultaneous testing of more than one piece of equipment.

SUMMARY OF INVENTION

It is an object of this invention to provide a novel, continuous loop-type recorder.

It is a further object of this invention to provide a continuous, loop-type recorder having analog-recording capabilities.

It is a further object of this invention to provide an electrostatic, continuous, loop-type recorder.

Various other objects and advantages will appear from the following description of embodiments of this invention, and the most novel features will be particularly pointed out hereinafter in connection with the appended claims.

It will be understood that various changes in the details, materials and arrangements of the parts which are herein described and illustrated in order to explain the nature of the invention, may be made by those skilled in the art.

This invention comprises electrostatically recording with an apparatus having a plurality of conductive segments capacitively coupled to a conductive element through an insulative member, with coupling an electrical signal to the segments for charging thereof, sensing charge on the segments and moving the segments with respect to the coupling and sensing means, or vice versa.

DESCRIPTION OF DRAWING

The present invention is illustrated in the accompanying drawing wherein:

FIG. 1 is a perspective view showing one embodiment of the electrostatic recorder and accompanying schematically illustrated circuitry in somewhat simplified form;

FIG. 2 is a fragmentary expanded perspective view of a portion of the electrostatic recorder of FIG. 1;

FIG. 3 is a schematic diagram of a typical sensing and amplifying circuit which may be used with an electrostatic recorder constructed in accordance with this invention;

FIG. 4 is an elevation top view of a variation of the recorder of FIG. 1 showing the coupling and sensing means to different channels of recording segments;

DETAILED DESCRIPTION

Figure 5:
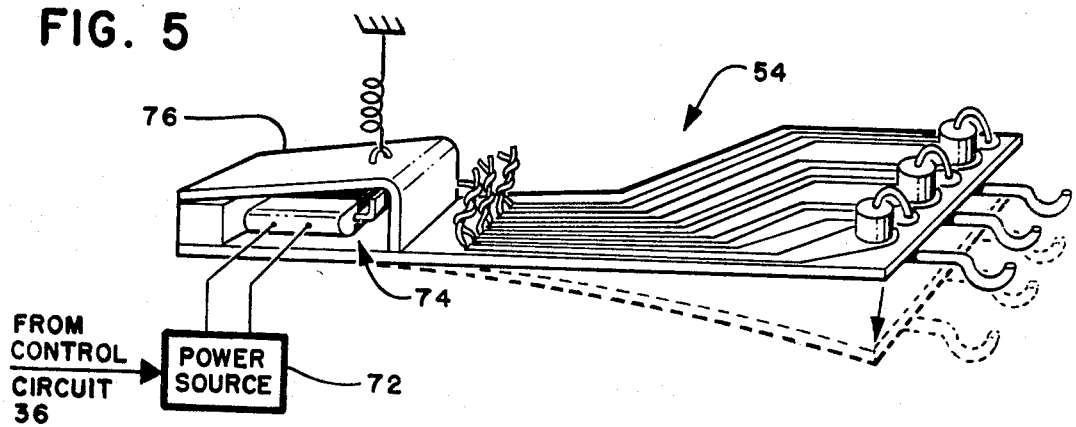
FIG. 5 is a detailed view of a typical sensing head for the multichannel-type electrostatic recorder shown in FIG. 4.

In the embodiment shown in FIG. 1, the electrostatic recorder 10 is formed from an insulative plate or disc-shaped base member 12 having a plurality of electrically conductive segments 14 disposed in an array about one of the major surfaces of base member 12. Each of the segments 14 in the array is of wedge shape having narrow wedge-shaped or uniform width airgaps 18 disposed therebetween, as shown in greater detail by segments 14a, 14b and 14c in FIG. 2. The opposite surface of base member 12 may have an electrically conductive element 16 disposed thereon coextensive with segment array 14 and in capacitive coupling through base member 12 with segment array 14.

For purpose of illustration, segments 14 and airgaps 18 are shown with exaggerated dimensions. In a typical electrostatic recorder incorporating features of this invention, the recorder may include as many as 1,600 segments or more in an array having an outer circumference of about 36 inches. In such an arrangement, the segment may vary from about 17 mils at the rim or outer circumference to about 4 mils near the central axis leaving uniform airgaps of about 4 mils wide. The segments and conductive element may typically be made of a conductive material, such as copper or nickel, having a thickness of about 2 mils with an insulative base member 12 about 16-mils thick, though other thicknesses and relative sizes may be used depending on the particular application. Base member 12 may be made of certain glass-epoxy, paper, or other conventional insulative material or an insulative material having memory capabilities for certain applications where signal modulation is desirable. Particularly satisfactory materials may include commercially available circuit boards or metal-clad laminates having the desired conductive layers on opposite sides or one side of an insulative substrate. The segment array may then be readily and inexpensively formed by conventional photoetching techniques to provide the desired segment array pattern.

With such an arrangement, each segment 14 of the array forms a capacitor with element 16 having a capacitance proportional to the area of the segment. Such capacitive segments have maintained electrical charges recorded thereon for periods of 48 hours and more, even after repeated sensing and playback of the stored information.

Electrical signals, such as from a signal source 20 may be recorded on electrostatic recorder 10 through appropriate coupling and charging device, shown schematically by contact 22. Contact 22 may be any appropriate wiping or other direct type electrical contact. Signal source 20 may be any signal generating or producing equipment or apparatus such as the apparatus used to test a piece of equipment like the contact resistance of a relay under life test.

The charge on the individual segments may be sensed by an appropriate sensing circuit and utilization means 24 through contact 26. The sensing may be achieved through conventional amplifying circuits from the charge picked up by contact 26 or by a field effect transistor having its gate electrode connected to contact 26. Utilization means 24 may be any electrical circuits or apparatus which will sense the level of the charge and/or provide some visual or other indication of the charge such as by a pen recorder or other display.

A particularly appropriate sensing circuit and contact arrangement is shown in FIG. 3. Sensor 28 may include a field effect transistor 30 having contact 26 connected to the gate thereof through a shield 32. The field effect transistor 30 may be coupled to appropriate biasing fields through a linearity or gain control resistor 34 and a zero balance circuit 36. Such an arrangement can sense very low voltages with little or no power drain from the segmented capacitors with good repeatability and accuracy. If desired, contact 26 and field effect transistor 30 may pick up the recorder charge without contact with segments 14 by positioning contact 26 a predetermined and uniform distance above the segment array, subject to lower sensitivity and any wobble or movement of the recorder disc and imperfections thereof.

In order to charge the individual segments and sense the charge recorded thereon, the segments or contacts 22 and 26 must be moved with respect to each other. Such movement may be achieved by utilizing a variable-speed drive system coupled to the electrostatic recorder 10 at the axis or rim, such as by a variable-speed motor 31 having base member 12 rotatably mounted thereon through shaft 33 and mounting plate 35. Motor 31 may provide a desired speed adjustment or an appropriate drive transmission may be disposed between motor 31 and shaft 33 with a capability of producing selectable speeds. Recording and playback speed may range from about 2 to 300 revolutions per minute or more depending on the frequency of signal being recorded and the desired relative frequency of the playback. An electrostatic recorder 10 having 1,600 segments disposed in an annular array and rotated at about 30 revolutions per minute will provide about 2 seconds recording time per revolution. At a speed of 2 revolutions per minute, about 50 segments will pass each contact 22 or 26 per second. The upper limit of recording or playback speed may be determined primarily by the mechanical precision by which the recorder may be manufactured and the tracking speed of the contacts. At higher speeds, the disc will be more subject to wobble and fluctuations resulting from imperfections in the recording or drive system.

The electrostatic recorder 10 may be operated by rotating the segmented capacitor disc at some prescribed speed, selected in regards to the frequency of the signal being recorded. The signal produced by signal source 20 may then be fed to contact 22 and the segments 14 passing thereunder charged to a voltage representative of this signal. When the signal has been recorded or an anomaly in the signal sensed, signal source 20 may be deenergized or contact 22 removed from contact with segments 14. If it is desired, the speed of motor 31 or the drive system may be changed to a faster or slower speed, depending on the desired playback frequency of the signal and the analysis or use to be made thereof, or it may be maintained at the same speed. The sensing contact may be maintained in continuous contact with the segments 14 or it may be brought into contact therewith when it is desired to play back the information recorded on recorder 10. The signal picked up by contact 26 and sensed and amplified by sensor 28 may then be recorded or otherwise utilized by utilization means 24. The operation of signal source 20, speed control motor 31 and operation of sensor 28 and contacts 22 and 26 may be controlled by an appropriate automatic control circuit 36 so that regardless of when the anomaly occurs in the signal, the recording on electrostatic recorder 10 may be terminated immediately and the information then on record, that is the signal immediately preceding the anomaly and slightly thereafter on the last revolution of electrostatic recorder 10, may then be played back and utilized.

If desired, the recorder can be stopped at any location or stepped point by point and segment by segment through different locations and the level of charge sensed thereat. Thus, with the recorder maintained at one location, a static calibration may be accomplished. Further, a sine wave or other form of wave or pulse may be recorded on the segmented capacitor disc at one speed and played back at a different speed to obtain a different frequency of the same wave shape, thus acting as either a frequency divider or multiplier. As a sensor of a malfunction or an anomaly in a continuous-type test, the recorder can be operated continuously at some prescribed rotation speed recording and rerecording the signal from signal source 20 until such time as the malfunction or anomaly occurs without requiring an excessively large memory capacity.

Additional capacity may be provided by positioning an electrostatic recorder including a base member, segments and conductive element similar to member 12, segments 14 and element 16 of FIG. 1 back to back as shown by recorder 38 in FIG. 2. Additional rigidity may be achieved by placing a conductive or insulative support member 40 sandwiched between the two electrostatic recording discs. Each such recorder would require a signal source and recording contact and other electrical circuitry as shown in FIG. 1.

The memory capacity of the electrostatic recorder 10 may also be increased by providing a plurality of concentric annular channels or rows of segmented conductor arrays as shown in FIG. 4. In FIG. 4, the wedge-shaped segments have been further segmented by annular airgaps 42 and 44 to provide three rows or channels 46, 48 and 50 of segment arrays. Information may be recorded and played back from the respected channels by contact arrangements 52 and 54. Each of these arrangements utilizes a printed circuit-type board 56 and 58 having conductive paths for each channel photoetched thereon, such as conductor path 60 on arrangement 52 for contact 62 and conductive paths 64 and 66 for the field effect transistor 68 and contact 70 on contact arrangement 54. The contact arrangements may be brought into contact with the respective channels by a mechanism as shown in FIG. 5 using a power source 72 to energize a solenoid 74 and pull spring-biased member 76 against contact arrangement 54 to push contact arrangement 54 against the recorder disc. Using a multichannel electrostatic recording disc as shown in FIG. 4, more than one variable or parameter of the equipment being tested may be monitored simultaneously on a single disc and played back simultaneously. Each of the channels may be provided with comparable or equal segment surface areas and capacitance by varying the radius of the airgaps if desired, as shown. It has been found that with a disc having an outer circumference of 36 inches that up to 10 different channels may be provided, each having about 1,600 recording segments. As will be apparent, as the number of channels increases, the charge capacity or capacitance of the segments will be decreased. However, because of the high impedance characteristics of the gate electrode of the field effect transistor pickup, this may not be significant, especially where only a minimum number of playbacks is necessary.

Figure 6:
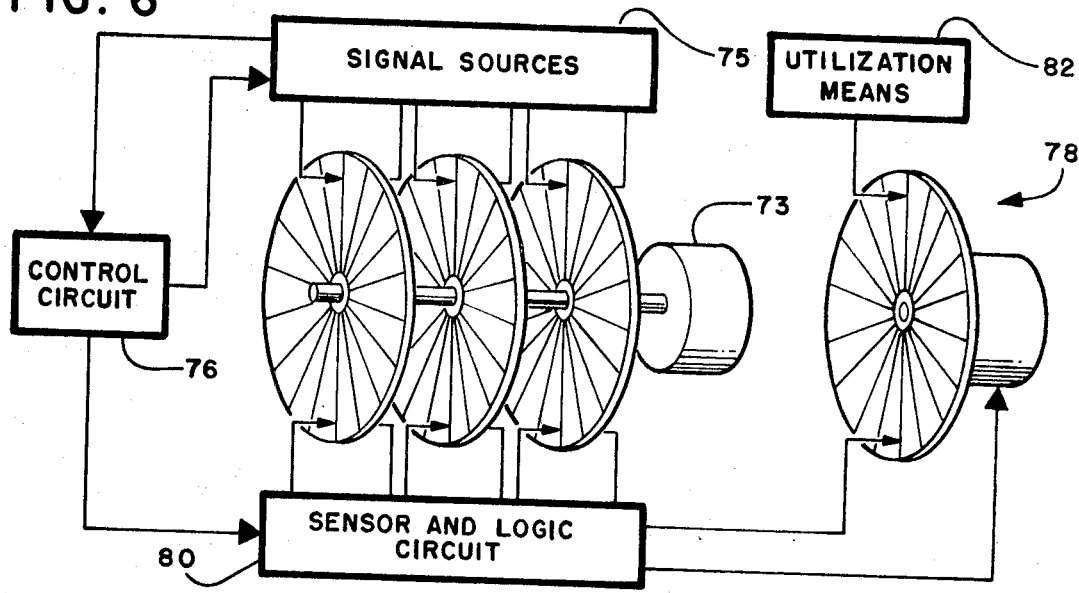
FIG. 6 is a somewhat diagrammatic perspective view of another modification of this invention.

A plurality of electrostatic recording discs, either of the type shown in FIGS. 1, 2 or 4 or combination thereof, may be mounted on a common shaft and rotated by a single drive means 73 as shown in FIG. 6. With such a system, simultaneous tests may be run on the same or different equipment and the desired signals monitored and recorded by these recording discs using an appropriate signal source circuitry 75. When a malfunction or anomaly occurred in one or more of the simultaneously run tests, an appropriate control circuit 76 may sense such malfunction or anomaly and energize the appropriate sensor and signal source and play back the desired information as described above with respect to FIG. 1. However, if it is desired to play back the malfunction or anomaly signal without disturbing the other simultaneously running tests, the anomaly or malfunction signal may be transferred to a supplemental recorder 78 by the sensor and logic circuit 80, the sensor and logic circuit 80 now acting as the signal source for the supplemental recorder 78. The supplemental recorder 78 may then run at a separate speed and the information played back into utilization means 82 without disturbing the other tests being run. If the anomaly or malfunction was of a temporary nature, the test could then be continued on the equipment which had indicated such anomaly or malfunction.

Figure 7:
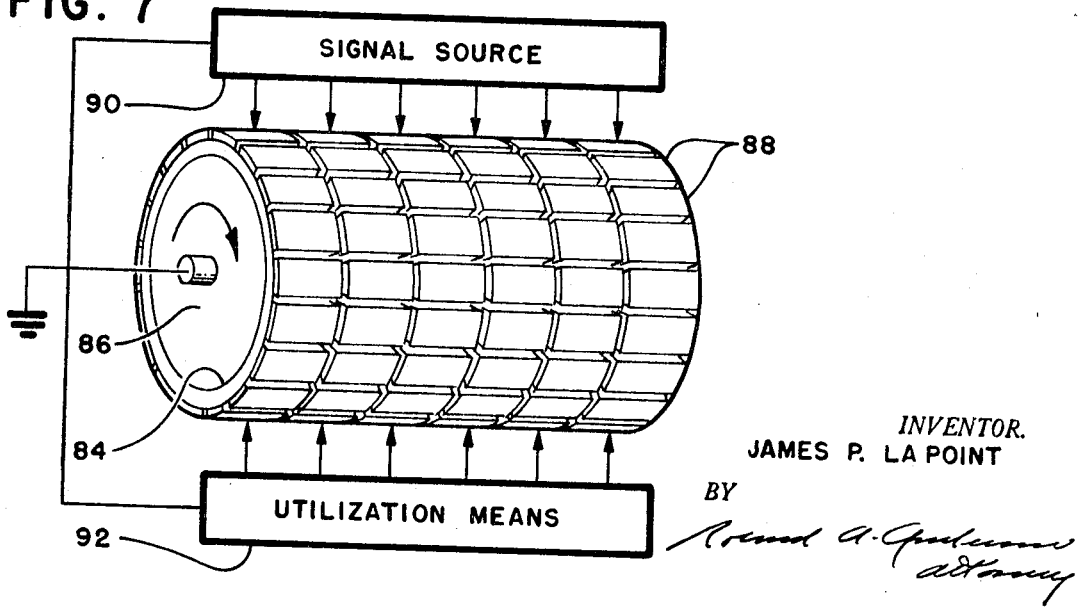
FIG. 7 illustrates still another embodiment of an electrostatic recorder incorporating features of this invention.

Other segmented recording capacitor configurations may be utilized, such as the drum type shown in FIG. 7. In this configuration, insulated base member 84 may be in the form of an elongated tube with rectangular segments disposed on the outer surface thereof. The conductive element 86 capacitively coupled to segments 88 may form the main central structure or portion thereof. Segments 88 may be arranged with annular gaps around the drum surface to provide a plurality of channels, as shown, with appropriate signal source means 90 and utilization means 92 connected thereto in the same manner as described with respect to FIGS. 1 and 4 above. Other configurations which may be used include belts with the segments disposed on one surface of the belt and the conductive element on the other surface or on planer base members with one or more rows of segments disposed on a surface thereof and capacitively coupled to a conductive element on another surface. With each of these arrangements, some means may be provided to move the segments with respect to the recording and pickup contacts.

Using electrostatic recorders as described above, a wide range of recording and playback functions may be achieved. The electrostatic recorder disc may be readily manufactured, such as from commercially available printed circuit-type boards using photoetching techniques with low cost and high precision. Such systems may provide many thousands of hours of continuous recording and playback use, limited only be segment and contact wear, which is minimal. Signals may be directly recorded on the recorder disc without intermediary amplifiers or other types of circuits and the same signal played back directly by the sensor, thus providing a high signal-to-noise ratio. The recorded signals may be of analog or digital type and more than one signal may be simultaneously recorded on a single channel or array of segments to provide a mixing of signals.

What is claimed is:

1. A system for electrostatically recording electrical signals comprising an electrically insulative base member; a plurality of arrays of spaced-apart electrically conductive segments carried by said base member; an electrically conductive element carried by said base member at a surface generally opposite said arrays for capacitive coupling with said segments of each of said arrays; means for coupling a signal to each of said arrays to levels representative thereof; means including a field effect transistor for each array having gate electrodes coupled to the segments of each of said arrays for sensing charges on said segments; means for effecting relative movement between said segment arrays, said coupling and charging means, and said sensing means; an auxiliary electrostatic recorder including an insulative base member, segment array, conductive element, coupling and charging means, and field effect transistor sensing means; means coupled to the sensing means of said plurality of segment arrays for transferring charge from a selective one of said segment arrays of said plurality of arrays to the coupling and charging means of the segment array of said auxiliary recorder; and means for rotating said auxiliary recorder array at a first angular velocity when charging said auxiliary array segments and at a second angular velocity when sensing segment charges on said auxiliary recorder.

2. The system of claim 1 wherein said base members are discs and said segments are of wedge shape and said base members, segment arrays, and conductive elements are each substantially coextensive.

3. The system of claim 2 wherein insulative gaps divide said segments to form a plurality of annular rows about each said disc.

4. The system of claim 2 including a pair of said electrostatic recorders sandwiched on either side of a rigid drive disc with said conductive elements in contact therewith.

5. A method of recording an electrical signal comprising rotating a first array of conductive segments capacitively coupled to a common conductive element at a first angular velocity about an axis, charging said segments with said signal, rotating a second array of conductive segments capacitively coupled to a common conductive element at said first angular velocity about an axis, transferring the charge on said segments of said first array to the segments of said second array, thereafter rotating said second array at an angular velocity different from said first angular velocity, and sensing the charge on said segments of said second array.

* * * * *